United States Patent [19]

Numata et al.

[11] 4,187,487
[45] Feb. 5, 1980

[54] MOVING OBJECT DETECTION SYSTEM

[75] Inventors: Hiroshi Numata, Otokuni; Akihiko Otani, Uji; Masao Mizuno, Kyoto, all of Japan

[73] Assignee: Omron Tateisi Electronics Co., Kyoto, Japan

[21] Appl. No.: 901,396

[22] Filed: Apr. 28, 1978

[30] Foreign Application Priority Data

Apr. 28, 1977 [JP] Japan .................................. 52-49124
Apr. 28, 1977 [JP] Japan .................................. 52-49465

[51] Int. Cl.² ........................................... G01S 9/66
[52] U.S. Cl. ................................................ 367/93
[58] Field of Search .............. 340/1 T, 1 R, 1 C, 38 S

[56] References Cited

U.S. PATENT DOCUMENTS

| | | | |
|---|---|---|---|
| 3,102,252 | 8/1963 | Bolton | 340/1 T X |
| 3,255,434 | 6/1966 | Schwarz | 340/1 T X |
| 3,539,978 | 11/1970 | Steptnitz | 340/1 C X |

Primary Examiner—Richard A. Farley
Attorney, Agent, or Firm—Sughrue, Rothwell, Mion, Zinn and Macpeak

[57] ABSTRACT

This invention relates to a detection system for detecting presence of moving objects such as vehicles, etc. through utilization of ultrasonic energy which includes a predetermined location provided in memory unit and having stored therein time from transmission of ultrasonic energy till reception of reflected energy corresponding thereto from a road surface, circuitry for computing difference a between immediately preceding time from transmission of ultrasonic energy till reception of reflected energy corresponding thereto stored in the predetermined memory location and current time from transmission of ultrasonic energy and reception of reflected energy corresponding thereto, circuitry for storing in the predetermined memory location the current time from transmission of ultrasonic energy till reception of reflected energy corresponding thereto when the difference a is less than a predetermined time $\alpha$, and circuitry for outputting vehicle detection signal when the difference a is larger than a preset time $\beta$ which is larger than the time $\alpha$.

11 Claims, 31 Drawing Figures

Fig. 6

| Y\X | 0 | 1 | 2 | 3 |
|---|---|---|---|---|
| 0 | Reception counter | | | |
| 1 | | 1m sec counter | 2m sec counter | 32m sec counter |
| 2 | | | Detection gate fall setting (low order) | Detection gate fall setting (upper order) |
| 3 | | Transmission with | Detection gate rise setting (value doubled) | Detection gate rise setting (value doubled) |
| 4 | | Reception counter I (low order) | Reception counter I (intermediate order) | Reception counter I (upper order) |
| 5 | | | | |
| 6 | | α value setting | β value setting | |
| 7 | | | Period setting (low order) | Period setting (upper order) |
| 8 | | | | |
| 9 | | | | |
| 10 | | | | |
| 11 | | | | |
| 12 | | | | |
| 13 | Code flag | Reception counter II (low order) | Reception counter II (intermediate order) | Reception counter II (upper order) |
| 14 | | Road level counter (low order) | Road level counter (Intermediate order) | Road level counter (upper order) |
| 15 | | | | |

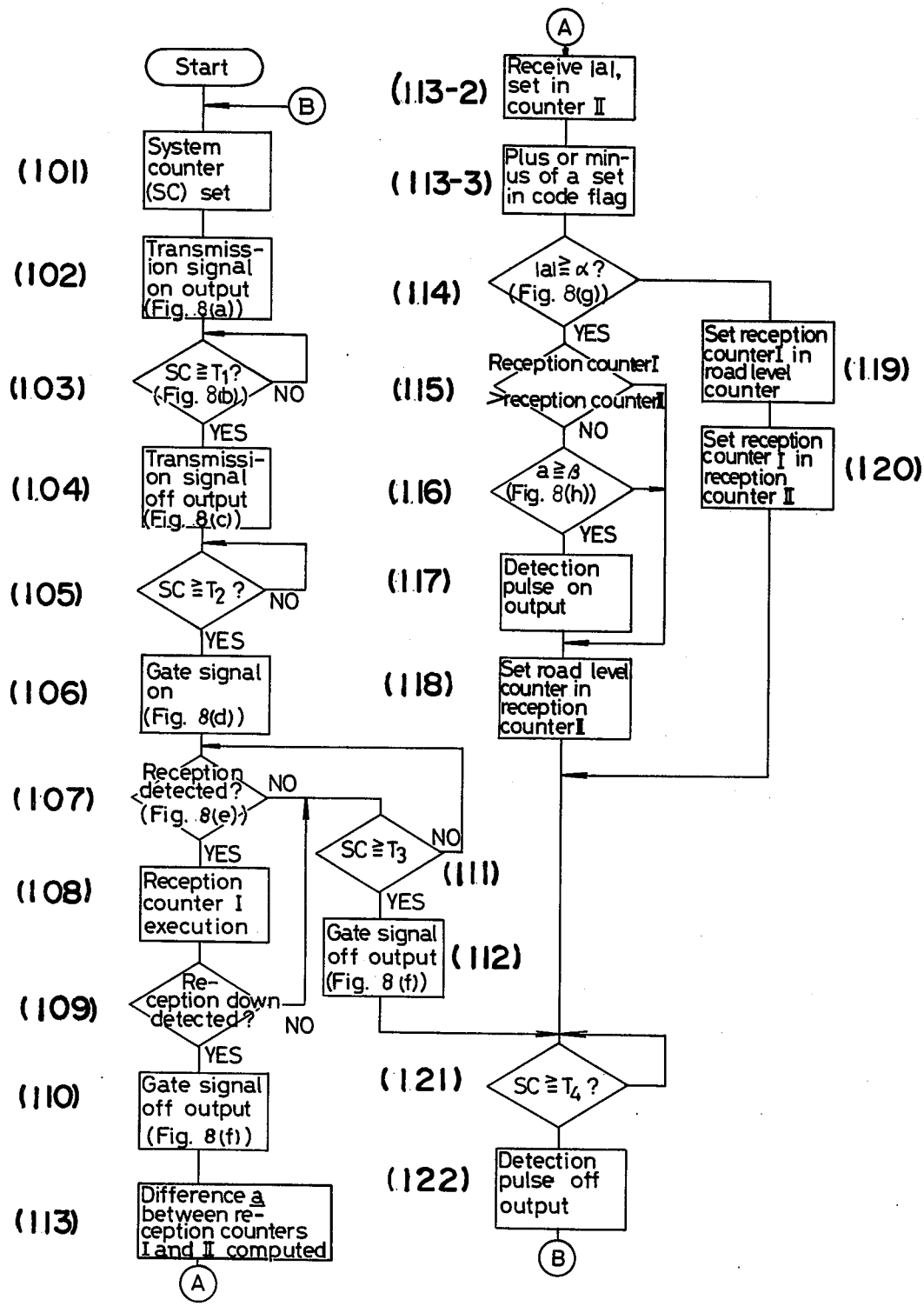

(Transmission signal on output)

(SC≧T1)

(Transmisson signal off output)

(Signal on output)

(Gate signal off output)

(α value comparison) (β value comparison)

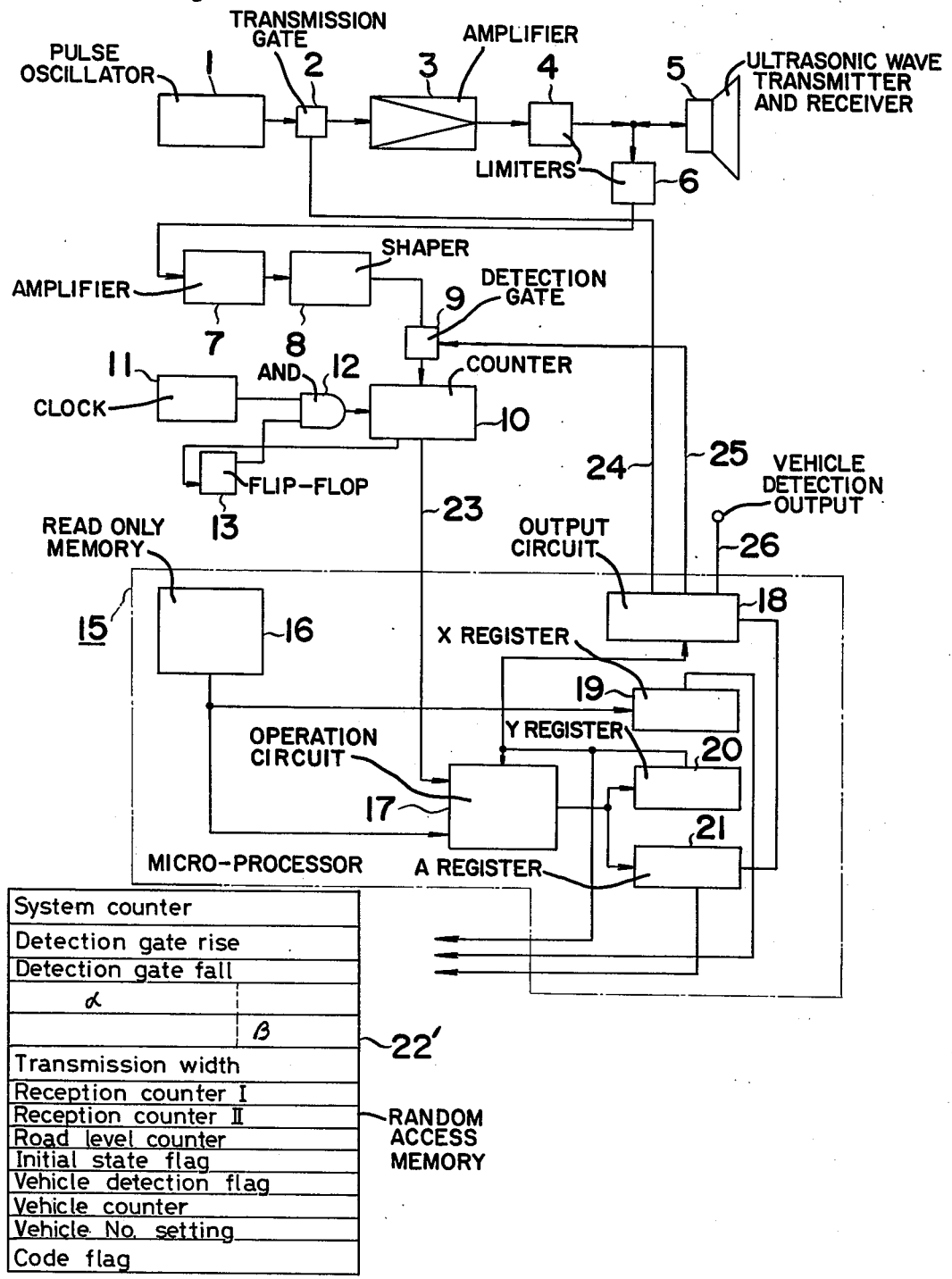

Fig. 10

| Y\X | 0 | 1 | 2 | 3 |
|---|---|---|---|---|
| 0 | Reception counter | | Initial flag | |
| 1 | | 1m sec counter | 2m sec counter | 32m sec counter |
| 2 | | | Detection gate fall setting (Lower order) | Detection gate fall setting (Upper order) |
| 3 | | Transmission width | Detection gate rise setting (value doubled) | Detection gate rise setting (value doubled) |
| 4 | | Reception counter I (Low order) | Reception counter I (Intermediate order) | Reception counter I (Upper order) |
| 5 | | | | |
| 6 | | α value setting | β value setting | |
| 7 | | Vehicle flag | Period setting (Low order) | Period setting (Upper order) |
| 8 | | Vehicle counter | | |
| 9 | | | Initial state max. No. setting | |
| 10 | | | | |
| 11 | | | | |
| 12 | | | | |
| 13 | Code flag | Reception counter II (Low order) | Reception counter II (Intermediate order) | Reception counter II (Upper order) |
| 14 | | Road level counter (Low order) | Road level counter (Intermediate order) | Road level counter (Upper order) |
| 15 | | | | |

Fig.12(a) (Vehicle flag on?)
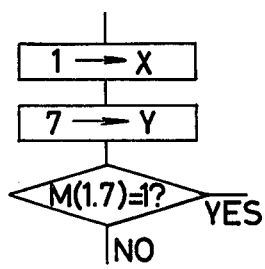
Fig.12(b) (Vehicle counter(n) addition)
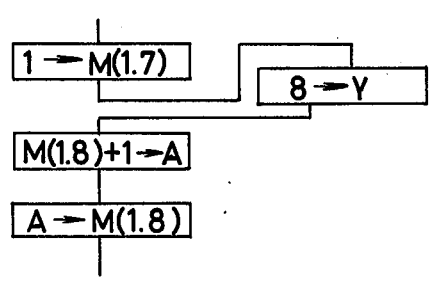
Fig.12(c) (Vehicle flag set)
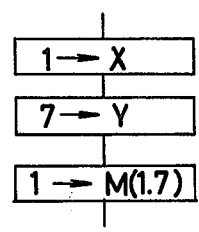
Fig.12(d) n ≧ N?
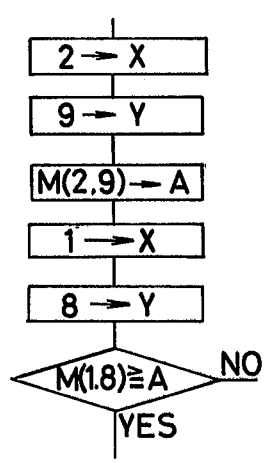
Fig.12(e) (Initial flag set)
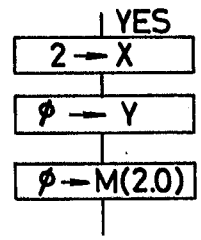
Fig.12(f) (Vehicle flag reset)
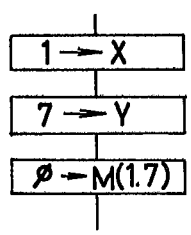
Fig.12(g) (Initial flag on?)
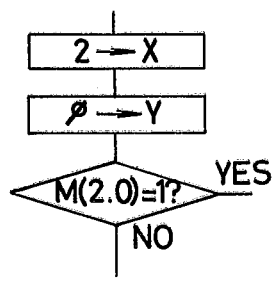
Fig.12(h) (Initial flag on)
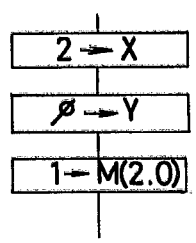

MOVING OBJECT DETECTION SYSTEM

BACKGROUND OF THE INVENTION

The present invention relates to an ultrasonic moving object detection system and more particularly, to a method for detecting the presence of moving objects through utilization of ultrasonic waves or energy with employment, for example, of a micro-processor, and an apparatus employed for effecting said method in which the detecting period is automatically set, especially when the presence of vehicles and the like is to be detected on the basis of reflection of ultrasonic energy directed to such vehicles to be detected.

In general, in order to detect the presence of moving objects such as vehicles or the like, for example, in a traffic survey, ultrasonic waves are directed toward a surface of the road for detection of the presence of vehicles on the basis of the time difference in arrival of reflected waves from the road surface and from the vehicles in the presence of such vehicles. More specifically, in FIGS. 1(a) to 2(d) explanatory of a known arrangement for moving object detection with the employment of an ultrasonic detector, a detecting unit UL selectively transmitting and receiving ultrasonic energy is provided at a height Ha from a road surface R for transmitting the ultrasonic energy from said detecting unit. In the absence of a vehicle V as shown in FIG. 1(a), the ultrasonic detector unit UL receives or detects reflection of waves from the road surface R, and if the time between the time point of ultrasonic wave transmission and that of reception of the reflected waves is designated as $\tau a$, such time $\tau a$ is represented by the following equation (1), $$\tau a = 2Ha/C \tag{1}$$

wherein C is the second velocity which is equal to $331 + 0.6T$(m/s) and T is the ambient temperature (° C). Meanwhile, in the presence of a vehicle V as shown in FIG. 1(b), the detector unit UL receives waves reflected from such a vehicle, and if the height of the vehicle V is denoted by Hc, and the height from the vehicle to the detector unit UL by Hb (Hb = Ha − Hc), with the time between the time point of the ultrasonic wave transmission to the reception of the reflected waves being designated as $\tau b$, such time $\tau b$ being represented by the following equation (2), $$\tau b = 2Hb/C = 2(Ha - Hc)/C \tag{2}$$

Therefore, the presence of vehicles may be detected by detecting whether the time interval between the transmission of the ultrasonic waves from the detector unit UL and the reception of the reflected waves by said detector unit UL is equal to the time $\tau a$ or $\tau b$ ($\tau a > \tau b$). As is seen from FIGS. 2(a) to 2(d) showing time charts for vehicle detection with the use of ultrasonic energy, time $\tau o$ for one period of transmission is selected to be larger than the time $\tau a$ between the time point of the ultrasonic wave transmission and the time point of the reception of the reflected waves from the road surface R, while the reflected wave detecting time $\tau b$ in the presence of the vehicle V is smaller than the time $\tau a$ mentioned above. For accurate detection of the wave reflected from the particular vehicle, however, it is necessary to properly define a gate period $\tau v$ during which the vehicle can be detected. Such vehicle detection gate period $\tau v$ is later than time $\tau l$ which is the sum of the time of the transmission and of the reverberation developed by the detector UL due to inertia immediately after said transmission and is selected to be slightly earlier (by the time $\tau h$ for preventing wrong detection, for example, of a raised road surface due to accumulation of snow as the presence of a vehicle) than the time point for the detection of the waves reflected from the road surface R. In the conventional arrangement as described above, however, proper adjustments are required in the installation of the detector unit UL, since the vehicle detection gate period $\tau v$ differs depending on the installing positions of such detector unit UL although the time periods $\tau l$ and $\tau h$ are of fixed nature, and such adjustments are conventionally carried out by skilled technicians at the site of installation with the use of an oscilloscope and the like through complicated procedures. As is seen from the foregoing description, in the known detecting apparatuses utilizing ultrasonic energy, it has been extremely difficult to properly set the vehicle detection gate period $\tau v$, and even if once properly adjusted, such vehicle detection gate period $\tau v$ must be corrected frequently due to alteration of propagation velocity of the ultrasonic waves by variations of sound velocity through fluctuations of external factors such as ambient temperatures.

In other words, in the detection of presence of vehicles by utilizing ultrasonic energy, it is commonly arranged that, in order to eliminate reverberation of the transmitted ultrasonic energy and influence of the reflected ultrasonic energy from a surface of a road, a wave-reception gate or detection gate of an ultrasonic transmitter-receiver is opened after an elapse of a predetermined period of time subsequent to transmission of ultrasonic energy, while such a detection gate is closed after an elapse of another predetermined period of time, so that when the reflected energy is received while the detection gate is kept open, the particular reflected energy is regarded as that coming from a vehicle for the detection of presence of such vehicles.

It should be noted here, however, that the velocity of propagation of ultrasonic waves varies depending on ambient temperatures and the like as mentioned earlier. Therefore, if the duration for opening such detection gate is fixed on the basis of the propagation velocity of ultrasonic energy at a given standard ambient temperature as in the known arrangement, there is a possibility that the ultrasonic energy reflected from the surfaces of roads may be received before the detection gate has been closed, for example, due to increase of the propagation velocity of the ultrasonic energy through variations of ambient temperatures, while on the contrary, if the propagation velocity is reduced, the ultrasonic energy reflected from a vehicle may reach the transmitter-receiver after the detection gate has been closed.

Therefore, an accurate detection of traffic would be made feasible if it were possible to detect the time of flight of reflected energy from the road surface to the transmitter-receiver in response to the variation in propagation velocity of ultrasonic energy and discriminate any reflected energy arriving with a time shorter than said flight time by a preset time span as energy from the traffic. For the above purpose, however, it is necessary to keep constant tabs on the flight times of reflected energy from the road surface to the ultrasonic transmitter-receiver.

In view of the foregoing problem, it is intended in the present invention to provide a method for automatically setting a standard plane which is such that regardless of any change in the flight time of reflected energy from the road surface to the transmitter-receiver, such flight times are automatically detected and set by means of a micro-processor, each flight time of reflected energy is compared with the set time and, when any particular flight time is smaller than said set time by more than a preset value, it is discriminated as energy reflected back from the traffic.

The term "standard plane" is used herein to mean the time after transmission of ultrasonic energy till the arrival of the corresponding reflected energy at an ultrasonic transmitter-receiver. Thus, the distance between the transmitter-receiver and the road surface is actually constant and, hence, the flight time of reflected energy from the road surface to the transmitter-receiver should be constant if the propagation velocity of ultrasonic energy be constant. However, a variation in flight time of reflected energy due to variations in the propagation velocity of ultrasonice energy may be regarded as a change in distance between road surface and transmitter-receiver. It may also happen that the surface of reflection is different from the actual road surface. If a variation in propagation velocity of ultrasonic energy be thus assumed to be a change in the relative distance between road surface and transmitter-receiver and the road surface be regarded as a standard plane, any reflected energy arriving within a time span shorter than the flight time of reflected energy from said standard plane by more than a preset time value may be discriminated as reflected energy from the traffic. The term 'standard plane' as used hereinbelow has the above meaning, namely the time after transmission of ultrasonic energy till the arrival of corresponding reflected energy at the transmitter-receiver.

SUMMARY OF THE INVENTION

Accordingly, an essential object of the present invention is to provide a moving object detection method and system employed therefor for detecting the presence of moving objects such as vehicles and the like through utilization of a micro-processor which are capable of emitting detection signals by positively identifying ultrasonic energy reflected from vehicles irrespective of fluctuations in propagation velocity of ultrasonic energy due to variations of ambient temperatures, etc.

Another important object of the present invention is to provide a moving object detection method and system employed therefor for detecting the presence of moving objects such as vehicles and the like as described above, in which, a standard plane is automatically set for correct identification of the ultrasonic energy reflected from the vehicles to be detected.

A further object of the present invention is to provide a moving object detection method and system employed therefor for detecting the presence of moving objects such as vehicles and the like as described above in which, in effecting the above control with the use of the micro-processor, no separate programming is required for preventing the set program from running again, for example, when ultrasonic energy reflected from a road surface is received after reception of the reflected energy from vehicles, with substantial elmination of disadvantages inherent in the conventional methods and systems of the kind.

A further object of the present invention is to provide an apparatus for embodying the method and system of detecting the presence of moving objects such as vehicles and the like as described above which is comparatively simple in construction and stable in functioning, and can be manufactured at low cost.

In accomplishing these and other objects, according to one preferred embodiment of the present invention, there is disclosed a moving object detection system for detecting the presence of moving objects such as vehicles and the like through utilization of ultrasonic waves or ultrasonic energy which includes a predetermined location provided in memory unit and having stored therein time from transmission of ultrasonic energy till reception of reflected energy corresponding thereto from a road surface, means for computing the difference a between the immediately preceding time from transmission of ultrasonic energy till reception of reflected energy correcponding thereto stored in said predetermined memory location and the current time from transmission of ultrasonic energy and reception of reflected energy corresponding thereto, means for storing in said predetermined memory location current time from transmission of ultrasonic energy till reception of reflected energy corresponding thereto when the difference a is less than a predetermined time $\alpha$, and means for outputting a vehicle detection signal when said difference a is larger than a preset time $\beta$ which is larger than said time $\alpha$.

More specifically, according to one preferred embodiment of the present invention, the detecting system as described above functions on the basis of a method of automatically setting a standard plane in the traffic detection system with the use of a micro-processor, and said method comprises the steps of providing in a memory a predetermined location in which a time after transmission of ultrasonic energy till reception of a reflected energy corresponding to said energy from a road surface is stored, determining a time after transmission of ultrasonic energy till reception of reflected energy corresponding to said energy by means of said microprocessor, loading the micro-processor with data from said predetermined memory location to compute a difference a from a time after a current transmission of ultrasonic energy till reception of reflected energy corresponding thereto, storing said current time in said predetermined memory location when said difference a is less than a preset time $\alpha$, storing data representing said current time till reception of reflected energy in said predetermined memory location when said difference a is less than $\beta$ which is a preset time larger than said time $\alpha$ and only in an initial state, and outputting a vehicle detection signal when said difference a is larger than said time $\beta$.

By the arrangement as described above according to the present invention, it has been made possible not only to correctly identify the reflected ultrasonic energy from the particular vehicles, but also to effect such identification irrespective of fluctuations in the propagation velocity of ultrasonic energy due to variations of ambient temperatures or the like, with substantial elimination of disadvantages inherent in the conventional traffic detection systems.

BRIEF DESCRIPTION OF THE DRAWINGS

These and other objects and features of the present invention will become apparent from the following description taken in conjunction with the preferred embodiment thereof with reference to the accompanying drawings, in which;

FIG. 6 is a map showing contents in each of areas of RAM (random access memory) employed in the arrangement of FIG. 5, FIGS. 7 to 8(h) are flow charts explanatory of sequence of operations of the arrangement of FIG. 5, FIG. 9 is a similar block diagram to FIG. 5, but particularly shows a modification thereof, FIG. 10 is a map showing contents in each areas of RAM (random access memory) employed in the modification of FIG. 9, and FIGS. 11 to 12(h) are flow charts explanatory of sequence of operations in the modification of FIG. 9.

Before the description of the present invention proceeds, it is to be noted that like parts are designated by like reference numerals throughout several views of the accompanying drawings.

DETAILED DESCRIPTION OF THE INVENTION

Figure 1A:
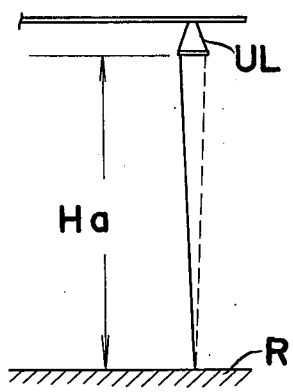
FIGS. 1(a) and 1(b) are schematic diagrams already referred to and explanatory of a conventional arrangement for moving object detection.
Figure 1B:
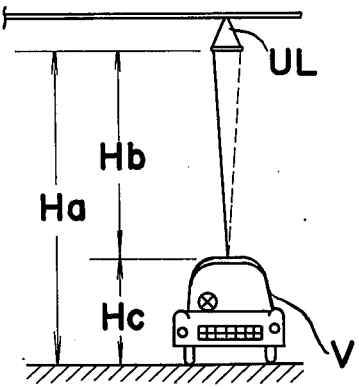
Figure 2A:
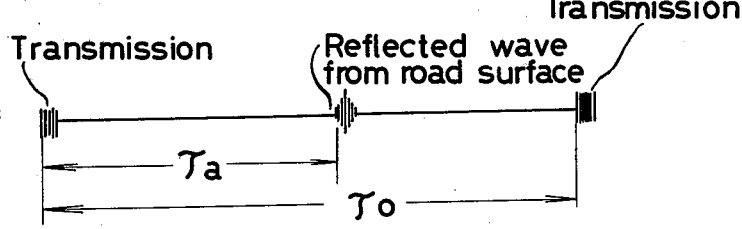
FIGS. 2(a) to 2(d) are time charts explanatory of moving object detection of FIGS. 1(a) and 1(b) through utilization of ultrasonic energy.
Figure 2B:
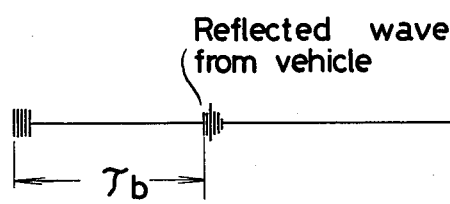
Figure 2C:
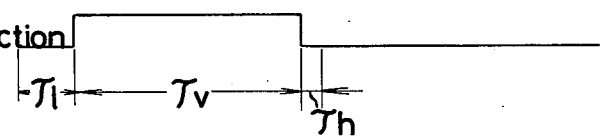
Figure 2D:
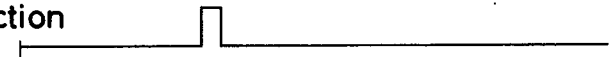
Figure 3A:
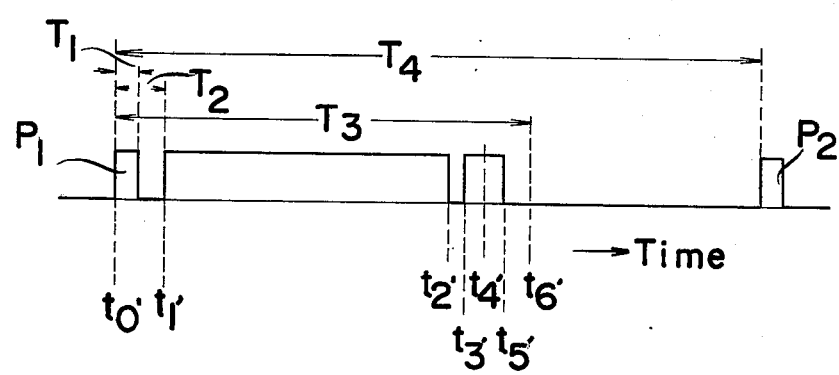
FIGS. 3(a) to 4 are graphs explanatory of principle of the present invention.
Figure 3B:
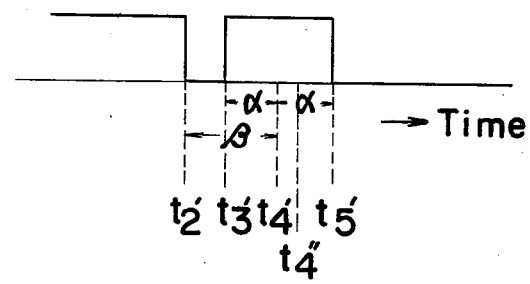

Referring now to the drawings, there are shown in FIGS. 3(a) and 3(b) graphs explanatory of the principle of the method of detecting presence of moving objects according to the present invention, in which horizontal axes represent time, and FIG. 3(b) particularly shows in detail the sequence from time-point t'2 to t'5 in FIG. 3(a).

In FIGS. 3(a) and 3(b), $P_1$ and $P_2$ represent the ultrasonic pulses transmitted at a period of $T_4'$ the width of transmission (pulse width) being designated as $T_1$. To allow for the reverberation, the wave reception gate (detection gate) is opened at a time-point $t_1'$ which is delayed by a duration of $T_2$ from the time-point $t_0'$ when the pulse was transmitted. The time-point at which the ultrasonic energy transmitted at time-point $t_0'$ is received by a transmitted-receiver is designated as $t_4'$. The time from time-point $t_0'$ to time-point $t_4'$ is variable within the range of $+\alpha$ due to variations in ambient temperatures, etc. The value $\alpha$ may be predetermined. The critical detection limit value for the difference in time between the reflected energy from the vechile and the reflected energy from the road surface is designated as $\beta$. $\beta$ is the value determinative of the vehicle detection limit and, for example, is the time required for an ultrasonic energy to make a return trip over a distance of 34 cm. By setting the value $\beta$ in this manner, the reflected energy can be judged as one coming from a vehicle when it is received before the time-point $t_2'$ which is earlier than time-point $t_4'$ by the magnitude of the time $\beta$. Thus, the values of $\alpha$ and $\beta$ are preset and the time which elapses after the transmission of ultrasonic energy and the reception of the corresponding reflected energy is judged by means of a micro-processor, which is loaded from a memory area in which the time after the transmission of ultrasonic energy to the reception of the corresponding reflected energy from the road surface has been stored to compute a difference a from the current flight time. If this difference a is not larger than the value $\alpha$, that is to say, the time up to the reception of reflected energy is within the range of $t_3'$ to $t_5'$ as counted from the time-point of $t_0'$ this reflected energy can be judged as coming from the road surface. Therefore, the data representing the time from the particular transmission of ultrasonic energy to the reception of reflected energy is stored in the above memory area. Thus, if the time till the reception of reflected energy is within the range of $t_0'$ to $t_4''$, the time data are stored in said memory area. This time is stored in the memory area on the assumption that the flight time of energy from the road surface has changed to a time from time-point $t_0'$ to time-point $t_4''$ for exampole due to a variation in ambient temperature, etc. Thus, the time from the subsequent transmission of ultrasonic energy to the reception of the corresponding reflected energy is compared with this time from time-point $t_0'$ to time-point $t_4''$ and the difference a is computed.

If the difference a is larger than the value $\beta$, it means that the reflected ultrasonic energy has been received before the time-point $t_2'$ and the particular reflected energy is judged to have come from the vehicle so that a vehicle detection signal output is generated.

Now, the procedure of setting the time-point $t_4'$ as shown in FIGS. 3(a) and 3(b) will be described with reference to FIG. 4.

Figure 4:
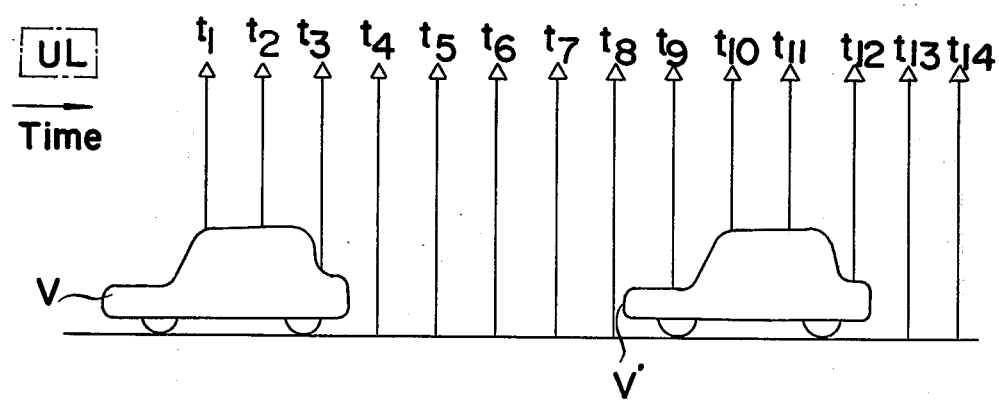

FIG. 4 shows the relative position of an ultrasonic transmitter-receiver UL and vehicles V and V', wherein chronological time is represented as elapsing in the sequence of t1, t2 . . . and t14. Up to the time-points t1 through t3 or the time-points t9 through t12, the reflected energy is assumed to have come from the vehicles, while it is assumed that, in other time points, the energy has been reflected from the road surface. The time data from the time-point $t_0'$ to the time-point $t_4'$ are first in a memory. The data are assumed to represent the flight time of energy reflected from an imaginary road surface. This imaginary road surface must be initially set. Thus, the time from the time-points $t_0'$ to $t_4'$ must be preset. Therefore, the period of time from the time-point when the traffic detection apparatus is energized to the time-point at which a total of, say, 15 vehicles have just passed the detection apparatus is now designated as the "initial state". In this initial state, the time from the time-point $t_0'$ to time-point $t_4'$ as shown in FIG. 3 is stored in the memory. First, in this initial state, a first ultrasonic energy is transmitted and the corresponding reflected energy is received. The time between said transmission and said reception is stored in the memory. In FIG. 4, the horizontal axis represents time, with t1 through t13 signifying various time-points and, at the same time, representing the times up to reception of the reflected energy at the respective time-points. Thus, for example, t1 not only represents time-point t1 but also represents the length of time before the reception of reflected energy takes place.

It will be seen from FIG. 4 that the flight time from the road surface is longer than the flight time of energy reflected from the vehicle and that there is always a reflected energy from the road surface between vehicles V and V'. Irrespective of the type of vehicle, and of the part of the vehicle which the reflected energy has come from, the flight time of energy reflected from the road surface is longer than the flight time from the vehicle. And the flight time from the road surface is longer than the flight time from the vehicle by the time $\beta$ and the change in time of the reflected energy from the road surface is smaller than the value α. Based on the above premises, the time after the energization of the traffic detection apparatus till the reception of reflected energy at the time-point t1 is stored in the memory and, thereafter, the difference a is computed at each of t2 and subsequent time-points. If $|a|$ is smaller than the value α, the data stored in the memory are updated to the particular current flight time data. In this initial state, however, even if a is larger than the value α, the data stored in the memory are updated to the current flight time when $|a|$ is smaller than the value β. However, if the flight time is shorter than the immediately preceding flight time and the difference a is larger than the value β, a vehicle detection signal output is generated. By repeating this function until a total of fifteen vehicles, for example, have been detected, the standard plane, that is to say, the actual flight time of ultrasonic energy from the road surface, is set. During the above series of functions, the data in the memory are not updated if the difference a is larger than the value β. Thus, if the current flight time is shorter than the time data stored in the memory area by a magnitude of β, the data in the memory are not updated.

Based on the principle as described in the foregoing, according to the present invention, the memory is provided with a predetermined location for storing the flight time data, and the time after the transmission of a given ultrasonic energy till the reception of the corresponding reflected energy is detected and processed by the micro-processor. Then, the micro-processor is loaded from the above predetetemined location of the memory to compute the difference a from the current flight time of ultrasonic energy. If the above difference a is less than the preset time α, the current flight time is stored in the predetermined memory location. If the difference a is smaller than the value β (also preset) which is larger than the time α, the current data representing the current flight time is stored in the above predetermined memory location only in the initial state. When the difference a is larger than the time β, a vehicle detection signal output is generated.

In another aspect, the present invention includes a memory having a predetermined location where the time after the transmission of ultrasonic energy till the reception of the corresponding reflected energy from the road surface is stored, a first reception counter location in which the flight time of ultrasonic energy is stored and a second reception counter location in which the previous flight time is stored. In this arrangement, the time after the transmission of ultrasonic energy till the reception of the corresponding reflected energy is processed by the micro-processor and, then, this time is stored in said first reception counter location. The difference a between the data of said first reception counter location and the data of said second reception counter location is computed and if the difference $|a|$ is smaller than the preset time α, the data of said first reception counter location are stored in both of said second reception counter location and said predetermined location. When the difference $|a|$ is larger than the time α and smaller than the preset time β which is larger than the value α, the value in said first reception counter location is stored in said second reception counter location only in the initial condition. When the difference a is larger than the time β, the data of said predetermined location are stored in said second reception counter location and a vehicle detection output signal is generated.

Figure 5:
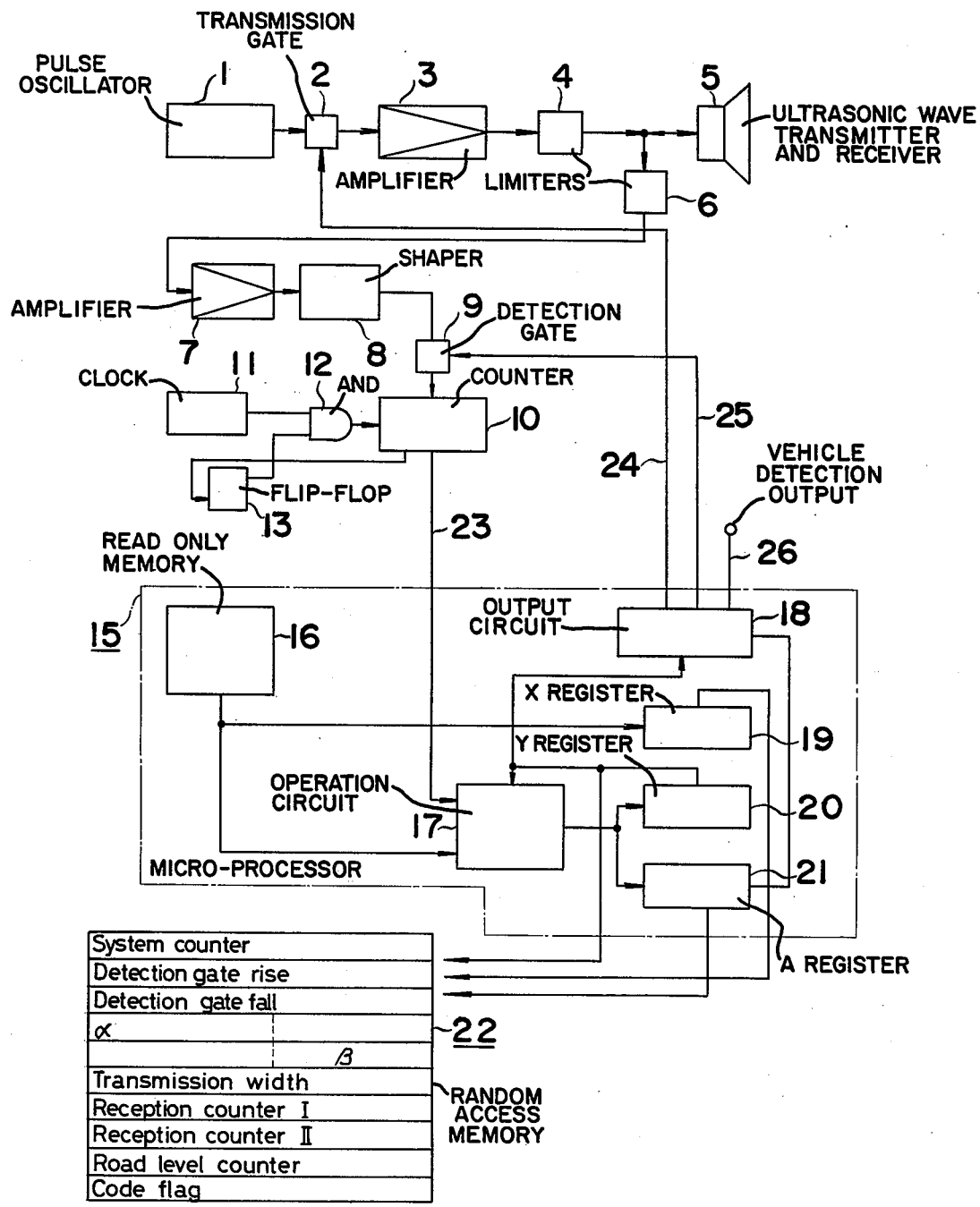
FIG. 5 is an electrical block diagram showing one preferred embodiment of the arrangement of the moving object detection system according to the present invention.

Referring particularly to FIGS. 5 through 8(h), there is shown in FIG. 5 an electrical block diagram illustrating one example of an apparatus for effecting the present invention. Before the description of the present invention proceeds, it is to be noted that, in this embodiment, arrangement is so made that the detection gate is opened by discriminating the time period receiving the reflected energy by means of a micro-processor mentioned later, which the detection gate being adapted to be closed upon judging by the micro-processor the time after the transmission of a given ultrasonic energy till the reception of the corresponding reflected energy. The micro-processor is subsequently loaded from a memory location storing the time from the transmission of the ultrasonic energy till the reception of the corresponding reflected energy from a road surface to compute the difference a from the current flight time of the ultrasonic energy. If the above difference a is smaller than a preset time α, the current data representing the current flight time is stored in the above memory location. When the difference a is larger than the preset time α which is larger than the time α, a vehicle detection output is developed.

Referring back to FIGS. 3(a) and 3(b), specifically, if the difference a between the time stored in the memory location and time till the reception of the current reflected energy is within the preset value α, the data of the memory location are updated, i.e., the time up to the reception of the current reflected energy is stored, and therefore, the time stored is equivalent to time between the transmission of the ultrasonic energy till the actual reception of the reflected energy from the road surface. It should be noted here that the arrangement may be so made that on the assumption that there are no vehicles at a first transmission of the ultrasonic energy, with the reflected energy from the road surface always present, the time up to the reception of the reflected energy at such time is first stored in the memory location. After storing the data in the memory location as described above, if the difference a is larger than the value β, this is regarded as the reflected energy from the vehicle to develop the vehicle detection signal. Since the latest time of the time actually required in the past is always stored as the time for reception of the reflected energy from the road surface, with reflected energy received within the time period less than such time by the time β being regarded as the reflected energy from the vehicle, it is possible to positively detect the reflected energy from the particular vehicle even if the propagation velocity of the ultrasonic energy is fluctuated. Furthermore, if the ultrasonic wave transmitter-receiver is provided with a detection gate circuit so that the detection gate is opened after the time $T_2$ subsequent to the transmission of the ultrasonic energy and is closed, for example, upon reception of the reflected energy from the vehicle, subsequent arrival of the reflected energy from the road surface is not received by the transmitter-receiver, since the detection gate has been closed as described above. Therefore, in the above case, it is unnecessary to provide separate program for preventing the existing program from running by the reflected energy from the road surface.

In the circuit arrangement of FIG. 5 according to the present invention, a pulse oscillator 1, a wave transmission gate 2, an amplifier 3, a limiter 4 and an ultrasonic wave transmitter and receiver 5 are coupled to one another for applying pulses developed at the oscillator 1 to the transmitter and receiver 5 through the gate 2, amplifier 3 and limiter 4. To a junction between the limiter 4 and the transmitter and receiver 5, there is connected a wave reception limiter 6 which is in turn sequentially coupled to a wave reception amplifier 7, a waveform shaping circuit 8, a detection gate 9 (wave reception gate) and then to a counter 10, and thus the wave reception output of the transmitter-receiver 5 is input to the counter 10 through the limiter 6, amplifier 7, waveform shaping circuit 8 and detection gate 9. A clock pulse generator 11, an AND circuit 12 and a flip-flop 13 are further coupled to the counter 10 in such a manner that the output of the generator 11 and the set output of the flip-flop 13 are inputs to the AND circuit 12, with the output of the AND circuit 12 being applied to the counter 10, while the output of the counter 10 upon reaching a predetermined count value is impressed to the flip-flop 13 as a reset input. The apparatus is provided with a microprocessor 15 (surrounded by a chain line in FIG. 5) which includes a ROM 16 (read only memory) containing a program, an operation circuit 17 coupled to the ROM 16 and also connected to the counter 10 through a line 23, an output circuit 18 which has a line 26 for developing the vehicle detection signal and whose output is further coupled to the wave transmission gate 2 through a line 24 and also to the detection gate 9 through another line 25, an X register 19 coupled to the ROM 16, a Y register 20 connected to the operation circuit 17 and an A register 21 also connected to the operation circuit 17. Further coupled to the apparatus is a RAM 22 (random access memory) which may either be included in the micro-processor 15 or be provided outside the micro-processor 15. It should be noted here that in the foregoing embodiment, the following items are employed for the micro-processor 15, the ROM 16, operation circuit 17, output circuit 18, X, Y and A registers 19, 20 and 21, and RAM 22.

Micro-processor 15: Four-bit, one-chip micro computer TMS 1000 of Texas Instruments Inc., U.S.A.
ROM 16: ROM 1702A of Intel
Operation circuit 17: Alaemetric Logic Unit MC 14581 of Motorola Inc.
Output circuit: ROM 1702T of Intel
X, Y and A registers 19, 20 and 21: RAM MC 14537 of Motorola Inc.
RAM 22: RAM MC 14537 of Motorola Inc.

Referring also to FIG. 6 showing a map of the memory contents for each location of the RAM 22, the respective areas which are each constituted by four bits are designated by the X register 19 and Y register 20, with areas (X=1, Y=14), (X=2, Y=14) and (X=3, Y=14), for example, having road level counters (low order), (intermediate order) and (high order). For this purpose, the road level counters are each constituted by twelve bits, with each four bits thereof being adapted to be of the low order, intermediate order or high order. Meanwhile, 1 m.sec.counter, 2 m.sec.counter and 32 m.sec.counter in the areas for (X=1, 2, 3, Y=1) constitute system counters so that the 1 m.sec.counter counts time at 1 m.sec.unit, 2 m.sec.counter at 2 m.sec.unit and the 32 m.sec.counter at 32 m.sec.unit. In the description hereinbelow, the area of the RAM 22 designated, for example, by X=m and Y=n is denoted as M (m, n).

Figure 8A:
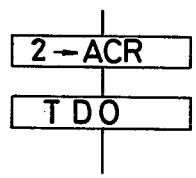
Figure 8B:
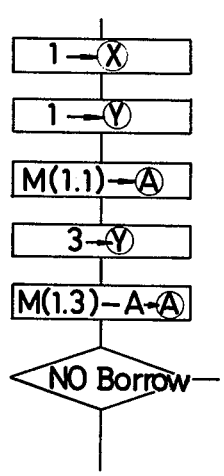
Figure 8C:
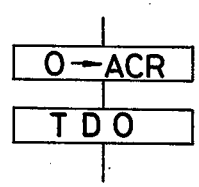
Figure 8D:
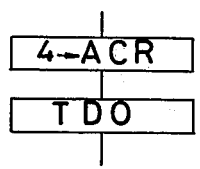
Figure 8E:
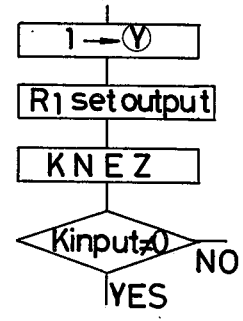
Figure 8F:
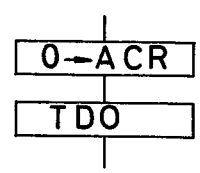
Figure 8G:
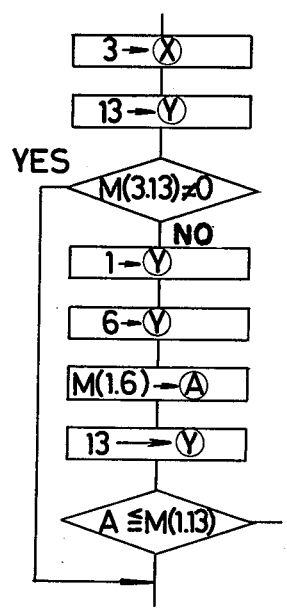
Figure 8H:
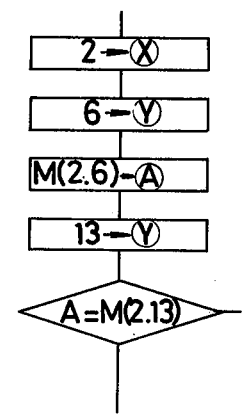

Referring also to flow charts of FIGS. 7 to 8(h), the function of the detection system of FIG. 5 will be explained. In FIG. 7, codes (101) through (122) given alongside blocks represent the respective step numbers, and hereinbelow these steps will be referred to briefly as (101) through (122).

In the first place, upon turning ON of the power supply to the apparatus of FIG. 5, the operation circuit 17 functions in accordance with the program set in ROM 16. First at the step (101) the system counter (referred to as SC hereinbelow) of RAM 22 is set, and the wave transmission signal is output at the step (102). For the above function, the operation circuit 17 enters numeric value 2 into the A register 21 (labelled as ACR in FIG. 8(a)) for subsequent emission of the TDO instruction. Upon emission of the TDO instruction, the output circuit 18 is input with the content 2 of the A register 21 to render the signal in the line 24 to be "High", by which the gate 2 is opened, with the output of the oscillator 1 being applied to the ultrasonic wave transmitter-receiver 5 for transmitting the ultrasonic energy. At the step (103), inquiry is made to determine if the count of the system counter SC has reached the transmission wave width $T_1$ shown in FIG. 3. This is accomplished by entering numeric value 1 into the X register 19 (on the basis of an instruction by an instruction decoder (not shown) attached to the ROM 16), and also into the Y register 20, while the data of the 1 m.sec.counter of the location (FIG. 6) of M (1, 1) (which is the area of X=1, and Y=1 as described earlier) for the RAM 22 are entered into the A register 21, with subsequent entry of numeric value 3 into the Y register 20 for subtracting the data entered into the A register 21 from the data in the location (i.e., 32 m.sec.-counter of FIG. 6) of M (1, 3) which contain data of the wave transmission width $T_1$. Subsequently, the value entered in the A register 21 is subtracted from $T_1$, with the result being again entered into the A register 2. At this stage, inquiry is made to see if the result of the subtraction is zero or not to repeat the above function until zero is reached, and at "No borrow", i.e., when the result of the subtraction has reached zero, the step is moved to the step (104). In the above case, the wave transmission width time $T_1$ is regarded to have passed, and thus, wave transmission signal OFF is output. For the above function, numeric value 0 is entered into the A register (ACR) 21 as shown in FIG. 8 (C) for giving the instruction TDO, by which the output circuit 18 is input with the content (numeric value 0) of the A register 21 so as to render all the signals in the output lines to be "Low". Accordingly, the signal in the line 24 is rendered to be "Low" (all other lines are "Low"), and the gate is closed, with the wave transmission by the transmitter-receiver 5 being suspended.

Subsequently, at the step (105), inquiry is made to see if the system counter SC has reached the time $T_2$ of FIG. 3. When the time $T_2$ has been reached, the output for gate signal ON is developed at the step of (106). For the above function, numeric value 4 is entered into the A register 21 (ACR) as shown in FIG. 8(d) for giving the instruction TDO, by which the output circuit 18 is input with the content (numeric value 0) of the A register 21 to render the output of the line 25 to be "High". Accordingly, the detection gate 9 is opened, and in the presence of the wave reception output of the transmitter-receiver 5, such output is applied to the counter 10 through the limiter 6, amplifier 7, waveform shaping circuit 8 and detection gate 9. Although clock pulses from the generator 11 are applied to the counter 10 through the AND gate 12, the counter 10 does not count so long as the wave reception output from the transmitter-receiver 5 is not present. It is to be noted here that the flip-flop 13 remains to be set until the count of the counter 10 reaches a predetermined value so as to keep the AND gate 12 open by the output of the flip-flop 13, but that when the count of the counter 10 reaches a certain value, the flip-flop 13 is reset to close the AND gate 12.

Therefore, at the step (107), inquiry is made to see if the reception of waves is detected. For the above purposes, the numeric value 1 is entered into the Y register 20 for applying $R_1$ set output, with the line 23 being designated by the above function. Subsequently, instruction KNEZ is applied, by which instruction, the count of the counter 10 is entered into the operation circuit 17 through the line 23. If the count value is of zero, it is almost certain that no wave reception output is applied from the transmitter-receiver 5 to the counter 10. The counter 10 starts counting at the time point whereat the wave reception output is developed, but since the operation circuit 17 of the micro-processor 15 is arranged to read off the signal of the line 23 at every predetermined time period, such operation circuit does not always read off the output of the line 23 at the time point at which the wave reception output is developed. Therefore, if the output of the line 23 is read off after the wave reception output is developed, the count of the counter 10 is of a certain value different from zero. If the count value of the counter 10 is of a certain value different from zero, K input$\neq$0, and the operation circuit 17 forms the data of the wave reception counter 1. In the above case, due to the fact that the system counter SC continues to count from the time point of the wave transmission to make it possible to find the time up to the time point (referred to as t10) at which the micro-processor 15 reads off that the count of the counter 10 has reached a certain value different from zero, and that the time between the actual development of the wave reception output and the time point t10 is counted by the time counter 10, the time from the transmission of the ultrasonic waves to the initial stage of the reflected wave reception is obtained by subtracting the count value of the counter 10 from the count value of the system counter SC. The time thus obtained is regarded as data of the wave reception counter I, which are stored in the locations M (1, 4), M (2, 4) and M (3, 4) of the RAM 22. Such locations are those entered as the wave reception detection counter in the graph of FIG. 6. Subsequently, in the step (109), wave reception down detection is effected. Since the counter 10 is arranged to lose its output when the wave output reception of the transmitter-receiver 5 disappaears, "down" or absence of wave reception is detected by the output of the line 23 reduced to zero. It is to be noted, however, that in the steps (107) and (109), if results are respectively "NO", shifting is once made to the step (111) to see if the count of the system counter SC is longer than the time $T_3$ (FIG. 3), and if SC$\geq T_3$, gate signal OFF is developed at the step (112). ($T_3$ shows time later than the time point t5 by a certain value). Such function as described above is exactly the same as that in FIG. 8(c) as shown in FIG. 8(f), by which function, the signal of the line 25 of the output circuit 18 is rendered to be "Low" to close the detection gate 9. In the above case, it is to be noted that the signal of the line 24 is "Low", with the gate 21 being already closed. Upon detection of the wave reception down at the step (109), the gate signal OFF is developed at the step (110), which function is the same as in the step (112). Upon detection of the wave reception at the step (107) and of the wave reception down at the step (109), the difference a between the wave reception counters I and II is worked out at the step (113) after the detection gate 9 is closed at the step (110). In other words, the data of the counter I are subtracted from those of the counter II. The wave reception counter II is provided each at the locations M (1, 13), M (2, 13) and M (3, 13) of FIG. 8, and the data in these areas will be mentioned later. Upon working out of the difference a, such difference a is set in the wave reception counter II at the step (113-2) (in this case, previous data up to that time for this area are cancelled), and positive or negative sign for the difference a is set in the area M (0, 13) at the step (113-3). On the basis of the difference a worked out at the step (113), inquiry is made to see if $|a|\geq \alpha$ at the step (114). The value $\alpha$ is as shown in FIG. 3 and is set in the area M (1, 6) of FIG. 6. The above function for determining $|a|\geq \alpha$ is installed in FIG. 8(g). First, numeric value 3 is entered into the X register 19, and numeric value 13 into the Y register 20 to designate the location M (3, 13) for reading out the data thereof. Since it is clear that such data are those in the high order of the wave reception counter II (having the data of $\alpha$) and that if such data are zero, $|a|$ is larger than $\alpha$, the response is immediately YES at the step (114). Meanwhile, if the data of M (3, 13) are not zero, numeric values 1 and 6 are entered into the X register 19 and Y register 20 respectively, while the location M (1, 6) of the RAM 22 is designated to enter the data $\alpha$ thereof into the A register 21, with subsequent entry of numeric value 13 into the Y register 20 (The X register 19 remains to be 1) and designation of the location M (1, 13) to read out the data thereof for comparison of the data $\alpha$ of the A register 21 with the data of the location M (1, 13) so as to see if $\alpha \geq |a|$. In the above case, the difference $|a|$, after having been worked out at the step (113), is entered in the locations M (1, 13), M (2, 13) and M (3, 13). If the difference $|a|$ is smaller than the value $\alpha$, the data of the wave reception counter I are set in the road level counter (M (1, 14), M (2, 14) and M (3, 14)) at the step (119), and at the step (120), the data of the wave reception counter I are set in the wave reception counter II. On the contrary, if the value $|a|$ is larger than the value $\alpha$, inquiry is made at the step (115) to see if the data of the wave reception counter I are larger than those of the wave reception counter II, and this can be found by judging whether the sign of the value a entered in the location M (0, 13) is positive or negative. In the case where the data of the wave reception counter I, i.e., the time up to the current reflected wave reception is smaller than the time up to the reflected wave reception entered in the wave reception counter II, comparison is made between the values $\alpha$ and $\beta$ at the step (116), which comparison is effected by the program of FIG. 8(h). More specifically, numeric values 2 and 6 are respectively entered into the X register 19 and Y register 20 to designate the location M (2, 6) of the RAM 22 for reading out the data (the value $\beta$) of this area which are entered into the A register 21. Subsequently, numeric value 13 is entered into the Y register 20 so as to read out the value for the location M (2, 13) for comparison of the value $\beta$ of the A register 21 with the value of the location M (2, 13). If the value a is larger than the value $\beta$, detection signal (pulse) ON is output at the step (117). Such detection signal is brought to be ON by rendering the signal of the output line 26 for the output circuit 18 to be "High". In cases where the responses are YES at the step (115) and NO at the step (116) and the detection pulse is brought to be ON at the step (117), data of the road level counter are set in the wave reception counter II at the step (118). After completion of any one of the steps (112), (118) and (120), shifting is made to the step (121) to see if the system counter SC has reached the period $T_4$ of the wave transmission pulse, and when the period $T_4$ has been reached, detection pulse OFF is output at the step (122). This is effected by rendering the signal of the output line 26 to be "Low". Subsequently, the sequence is returned to the step (101).

As is clear from the foregoing description, in the arrangement of FIGS. 5 to 8(*f*) according to the present invention, since it is so arranged that the detection gate is opened (at the time $T_2$ in FIG. 3) through detection of the time for receiving the reflected energy by the micro-processor and said detection gate is closed through detection of the time from the ultrasonic wave transmission to the reception of the reflected energy also by the micro-processor, reflected energy is not received after such reflected energy has been received either from the particular vehicle or road surface, subsequent to one ultrasonic transmission, thus the inconvenience inherent in the conventional arrangements that after the program to be run by the wave reception is caused to run, for example, by the reception of reflected waves from a vehicle, such program is again caused to run by the reception of reflected waves from a road surface, is advantageously eliminated.

Furthermore, the arrangement as described above according to the present invention in which, through comparison of the time from the current ultrasonic wave transmission to the reflected wave reception and the data of the wave reception counter II, if the difference $|a|$ therebetween is smaller than the present time $\alpha$, the reflected waves are regarded as those from the road surface to update the data of the wave reception counter II to the time from the current wave transmission to the reflected wave reception, and if the difference $|a|$ is larger than the value $\alpha$, with the value a being positive and if the value a is larger than the value $\beta$ upon comparison of the values a and $\beta$, this is regarded as the reflected energy from the vehicle to output the detection signal, is effective for accurate vehicle detection irrespective of variations in the ultrasonic wave propagation velocity, since the wave reception counter II is always set with the latest actual time required for the reception of the reflected energy from the road surface for emitting the vehicle detection signal only when the time required for the current wave reception is shorter, by more than the set value $\beta$, than the time set in the wave reception counter II.

Referring particularly to FIGS. 9 through 12(*h*), there is shown in FIG. 9 a modification of the circuit arrangement of the detection system of FIG. 5. The modified detection system of FIG. 9 is arranged to function based on a method of automatically setting a standard plane in a moving object detection system which comprises the steps of providing in a memory a predetermined location in which a time after transmission of ultrasonic energy till reception of a reflected energy corresponding to said energy from a road surface is stored, determining a time after transmission of ultrasonic energy till reception of reflected energy corresponding to said energy by means of said microprocessor, loading the micro-processor with data from said predetermined memory location to compute a difference a from a time after a current transmission of ultrasonic energy till reception of reflected energy corresponding thereto, storing said current time in said predetermined memory location when said difference a is less than a preset time $\alpha$, storing data representing said current time till reception of reflected energy in said predetermined memory location when said difference a is less than $\beta$ which is a preset time larger than said time $\alpha$ and only in an initial state, and outputting a vehicle detection signal when said difference a is larger than said time $\beta$.

In the circuit diagram of FIG. 9 illustrating the modified arrangement as described above, since the circuit construction is generally the same as that in FIG. 5, detailed description thereof is abbreviated for brevity except for the contents of the RAM 22' which are to be described in detail hereinbelow.

Figure 11:
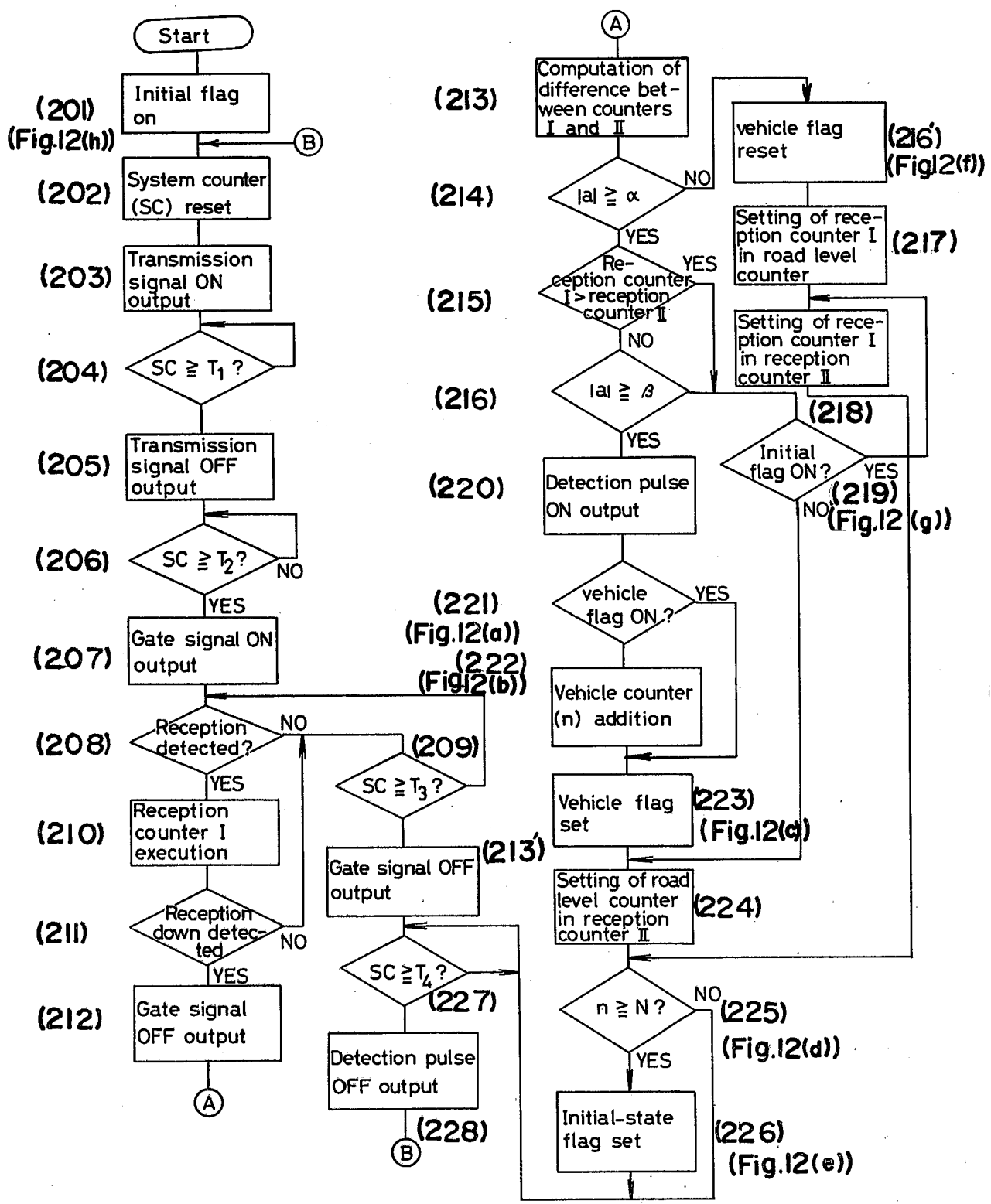

From the map of FIG. 10 and flow charts of FIGS. 11 to 12(*h*), it will be noticed that in the modified arrangement of FIG. 9, steps (221), (222), (223), (225), (226), (216'), (219) and (201) (shown in detail in FIGS. 12(*a*), 12(*b*), 12(*c*), 12(*d*), 12(*e*), 12(*f*), 12(*g*) and 12(*h*) respectively are further added to the steps of FIG. 7 for the embodiment of FIG. 5, while other steps of FIG. 11 for the modification are generally similar to those in FIG. 7.

In the modified arrangement of FIG. 7, the RAM 22' is provided with locations representing the functions of the system counter, detection gate rise- or fall-time setting, $\alpha$ and $\beta$ setting, reception-wave width setting, reception counters I and II, road-level counter, initial-state flag, vehicle detection flag, vehicle counter, vehicle number setting and code flag, respectively. These locations are respectively designated by the addresses set in the X-register 19 and Y register 20.

Function of the modified arrangement of FIG. 9 will be explained hereinbelow with reference to the graph and flow charts shown in FIGS. 11 to 12(*h*). In FIG. 11, the codes (201) through (228) given alongside blocks represent the respective step numbers and, hereinafter, these steps will be referred to briefly as (201) through (228).

In the first place, the power supply to the apparatus of FIG. 9 is switched on to start the operation. From this moment on, the operation circuit 17 functions in accordance with the program set in the ROM 16. First, at the step (201), the initial state flag in the initial flag area of the RAM 22 becomes ON (FIG. 12(*h*)). Then, at the step (202), the system counter of the RAM 22 is reset, whereupon the system counter starts counting. At the step (203), an output is generated which turns a wave transmission signal on, whereby the output of the line 24 of the output circuit 18 becomes "High", thus opening the gate 2 so that the output of the oscillator 1 is fed to the transmitter-receiver 5. Thereupon, this transmitter-receiver 5 transmits the ultrasonic energy. At the step (204), inquiry is made to determine if the system counter (SC in FIG. 11) has reached the transmission wave width $T_1$ shown in FIG. 3. This is accomplished by reading out the data in the transmission wave width location of RAM 22 into the A-register 21 and comparing it with the count of the system counter AC. When the count of the system counter AC has reached the transmission wave width $T_1$, a transmission signal OFF signal output is generated at the step (205), whereupon the output of the output circuit 18 becomes "Low" and the output of the line 24 which has been "High" becomes "Low". As the output of the line 24 becomes "Low", the gate 2 is closed so that the output of the oscillator 1 is no longer applied to the transmitter-receiver 5. At the step (206), inquiry is made to determine if the count of system counter SC has reached the time $T_2$ of FIG. 3. When the time $T_2$ (the value of the detection gate fall-location of RAM 22) is reached, an output is generated which makes the gate signal ON. By the above procedure, the output circuit 18 converts the signal of the line 25 to "High", thereby opening the gate 9. Until the gate 9 is opened, even if the transmitter-receiver 5 receives the reflected energy, its reception output is not applied to the counter 10. At the step (208), inquiry is made to see if the wave reception has been detected. This is discriminated by whether the count at the counter 10 is zero or a figure other than zero. The flip-flop 13 is set till the count of the counter 10 reaches a preset figure and the AND gate 12 remains open due to its set output. Although the clock pulse from the generator 11 remains to be applied to the counter 10 through the AND gate 12, the counter 10 does not perform counting until the wave reception output from the transmitter-receiver 5 is applied. Since the operation circuit 17 reads the signal of the line 23 at timed intervals, it does not necessarily read out the signal of the line 23 at the moment when the wave-reception output of the transmitter-receiver 5 is applied to the counter 10 but, normally, it reads out the signal of the line 23 at a slight delay from the time-point when the reception output is applied to the counter 10. When, after the application of the reception output to the counter 10, the operation circuit 17 reads out the signal of the line 23, the count of the counter 10 is a certain figure other than zero. Thus, if the count of the counter 10 is such a certain figure other than zero, it is assumed that a wave-reception detection has taken place and, hence, the data of the wave-reception counter I is executed at the step (210). The time after the transmission of the ultrasonic energy till the recognition of a reception detection has already been counted by the system counter SC but, as mentioned above, the time of the step (210) has been slightly delayed from the time when the wave-reception output was actually generated and the time corresponding to this delay has been counted by the counter 10. Therefore, by deducting the measured time value of the counter 10 from the measured time value of the system counter SC, the time till the actual reception of the reflected wave takes place. This is used as the data of the reception counter I and stored in the reception counter I area of the RAM 22'. At the step (211), enquiry is made to determine if there has been a shutdown in wave-reception. When there is a shut-down in the wave-reception, the reception output of the transmitter-receiver 5 is obliterated, whereby the count of the counter 10 is cancelled.

From the fact that the count of the counter 10 has once reached a certain value and, then, reached zero, it is detected that there has been a shut-down in wave-reception. At the step (212), the gate signal OFF output is generated, by which the output circuit 18 makes the signals of all the output lines "Low". In this situation, the signal of the line 24 which has been made "High" is made "Low", whereby the gate 9 is closed. If inquiries at the steps (208) and (211) each elicits a response of NO, it is inquired at the step (209) if the count of the system counter SC has reached the time $T_3$. The time $T_3$ is previously set at a time somewhat longer than the maximum wave-reception time as shown in FIG. 3 on the assumption of the time till the reception of the reflected waves from the road surface. If a wave-reception is not detected before the time $T_3$ or if there is no detection of a shut-down in the wave-reception, it indicates that some abnormality has taken place. Therefore, a gate signal OFF output is generated at the step (213').

Following the step (212), the difference a between the wave-reception counters I and II is computed at the step (213). At the time-point t1 as shown in FIG. 4, where no data is present in the reception counter II area, the difference a is equal to the data of wave-reception counter I which has been executed at the step (210). At the step (214), inquiry is made to see that $|a| \geq \alpha$, although the difference $|a|$ is naturally larger than the value $\alpha$. At the step (215), inquiry is made to determine if the reception counter I>reception counter II, although the response is naturally YES because the data in the reception counter II are zero. Therefore, a further inquiry is made to determine if the initial-state flag is ON at the step (219) (FIG. 12(g)), and because it is ON, the data in the wave-reception counter I are set in the wave reception counter II. At this moment, data enter the wave-reception counter for the first time. Then, inquiry is made at the step (225) to see if $n \geq N$ (FIG. 12(d)). The symbol N represents the number which has been stored in the vehicle-number setting location of the RAM 22' (initial predetermined sets of vehicles). Thus, when the initial state is the time until a total of fifteen vehicles have been detected, for example, the number of fifteen has been stored in that location. The symbol n represents the number of vehicles actually detected, and this information is stored in the vehicle counter location of the RAM 22' every time a vehicle is detected. Now that n is zero, the step (225) (FIG. 12(d)) is NO and the sequence proceeds to the step (227), where an inquiry is made to determine if the count data of system counter SC have been reached the time $T_4$. Assuming that there is a vehicle detection pulse at the time $T'_4$ an output is produced at the step (228) to make the pulse OFF and, going back to the step (202), the system counter SC is reset to commence counting anew, with a transmission signal ON output being produced at the step (203). In this manner, an ultrasonic sound wave is transmitted at a period of $T_4$. As the reflected wave derived from this transmission is received at the time-point t2, the data of reception counter I are executed at the step (210) and difference a is computed at the step (213). If this difference a is substantially equal to zero, the relation $a \geq \alpha$ does not hold true at the step (214) and, therefore, the vehicle flag is reset at the step (216') (FIG. 12(f)). In this instance, since the vehicle flag has not been set as yet, it remains as it is. At the step (217), the data of the reception counter I are set in the road-level counter, and at the step (218), the data of the reception counter I are set in the reception counter II. At the step (225) (FIG. 12(d)), inquiry is made to determine if $n \geq N$. Since the response is NO, the sequence goes back to the steps (202) through (227) and (228). Then, at the time-point t3, the data of reception counter I are executed at the step (210), difference a is computed at the step (213) and enquiry is made as to whether $|a| \geq \alpha$ at the step (214). If the relation of $|a| \geq \alpha$ does not hold true, the sequence goes back to the steps (202) through (216), (217), (226), (227) and (228), and in the course of this sequence, the data of the reception counter I are set in the reception counter II and road-level counter. If the relation $|a| \geq \alpha$ does not hold true, inquiry is made at the step (215) to see if the reception counter I>reception counter II. Since the response to this inquiry is NO, the sequence returns to the step (202) via the steps (219), (218), (225), (226), (227) and (228) and, in the course of this sequence, the data of the reception counter I are set in the reception counter II. In this manner, at the timepoint t3, irrespective of whether the response to the inquiry $|a| \geq \alpha$ is YES or NO, the current data of the reception counter I are set in the reception counter II. Then, at the time-point t4, the difference a is computed at the step (213) by a similar procedure, inquiry $|a| \geq \alpha$ being made at the step (214). The reflected waves at the time-point t4 are waves coming from the road surface and that at the time-point t3 are waves from a vehicle. Thus, the response to the inquiry $|a| \geq \alpha$ is YES. Therefore, inquiry is made at the step (215) to determine if the reception counter I>reception counter II. Since the response to this inquiry is always YES, the data of the reception counter I are set in the reception counter II at the step (218) via the step (219) and the sequence returns to the step (202) via the steps (224) or (228). At the time-point t5, the current data of the reception counter I are executed at the step (210) and a is computed at the step (213). Because, both at the time-point t4 and at the time-point t5, the reflected energy is from the road surface, the result of inquiry $|a| \geq \alpha$ at the step (214) is NO. Therefore, through the step (216') (because the vehicle flag has not been set as yet, there is no function here), the data of the reception counter I are set in the roadlevel counter II at the step (218). Therefore, at the time-point t5, the data of the road-level counter are at parity with the data of the reception counter II, the particular data being the data of the reception counter I at the time-point t5, that is to say, the time till the reception of the wave reflected back from the road surface takes place at the time-point t5. The waves reflected back from the road surface being available during the time series from t5 to t8, inquiry $|a| \geq \alpha$ is made at the step (214) to check the value a obtained by computation at the step (213) at each of these timepoints. Since the results are invariably NO, the data of the reception counter I executed at the respective time-points are set in the reception counter II and road-level counter at the steps (217) and (218). Thus, during the time series from t5 to t8, the time till reception of the ultrasonic energy reflection from the road surface is executed by the reception counter I at each time-point and the result is set in both the road-level counter and reception counter II. In this manner, the actual times up to the reception of the sound waves reflected from the road surface are sequentially set in the road-level counter and reception counter II at these time-points and, if a variation takes place in the time up to reception of the sound energy reflected from the road surface, the data in the roadlevel counter and reception counter II are updated each time such a charge has occurred. During the above function, the data of the road-level counter are at parity with the data of the reception counter II. Assuming that there is a reflection from a vehicle at the time-point t9, now the data of the reception counter I are executed at the step (210), the apparatus is loaded with the data of the reception counter II to compare and compute the difference a at the step (213) and inquiry is made at the step (214) to determine if $|a| \geq \alpha$. Therefore, inquiry is made at the step (215) to see if the reception counter I>reception counter II. Actually, because the value a as computed has been set in the reception counter II and the positive or negative sign of a has been set in the code flag area of the RAM 22 as shown in FIG. 5, the above determination at the step (215) is made with reference to said positive or negative sign in the above area. In this instance, because the data of the reception counter I are smaller than the data of the reception counter II, the inquiry $a \geq \beta$ is made at the step (216). At this timepoint, the relation is $a \geq \beta$ because the reflected energy is from a vehicle. Therefore, a detection pulse ON signal is generated at the step (220) and the output of the line 26 of output circuit 18 is made "High" to cause a detection signal to be generated. Inquiry is made at the step (221) to see if the vehicle flag is ON and, since the response is NO, the vehicle counter (n) is advanced by plus one at the step (222) to make n=1 (Vehicle counter (n) addition FIG. 12(b)). The vehicle flag is set ON at the step (223) (FIG. 12(c) and the road-level counter is set in the reception counter II. Thus, when the reflected energy from the vehicle has been received, the data of the road-level counter and reception counter II are not updated by the current data of the reception counter I. However, since the data of reception counter II has been converted to a, the data of the roadlevel counter is set in the reception counter II, whereby the data are reverted to the data prior to the time-point where the reflected energy from the vehicle was obtained, i.e. to the data at the time-point t8. The function at the time-point t10 is similar to that described for t9, up to the step (220). However, because the vehicle flag is already ON at the time-point t'10 the sequence advances from the step (221) (FIG. 12(c)), bypassing the step (222) (FIG. 12(b)), with the result that the vehicle counter will not count the same vehicle twice. At the step (224), the data of road-level counter (the data at the time-point t8) are set in the reception counter II. Thus, throughout the period in which the reflected energy from the vehicle is available, the data of the road-level counter and of the reception counter II are not updated but both remain to be the same as the reception time of reflected energy from the road surface at the time-point t8. The vehicle flag is reset in the step (216') (FIG. 12(f)) at the time-point t14 in the same manner as described with reference to the time-point t5.

As the above function is repeated until the detected number of vehicles n has reached a set number N (e.g. fifteen), the response at the step (225) (FIG. 12(d)) is YES and, hence, the sequence goes to the step (226) (FIG. 12(e)) where the initial-state flag is reset.

Because, up to the time of resetting of the initial-state flag, the time till reception of the reflected energy from the road surface has been repeatedly updated and set as correct values in the road-level counter and wave-reception counter II, the response at the step (214) is in the relation of $|a| \geq \alpha$ thereafter, and if the response at the step (215) is reception counter I>reception counter II, inquiry is made at the step (216) to determine if $|a| \geq \beta$. If the response to this inquiry is YES, a vehicle detection signal is generated. In case the response is NO, the sequence advances directly to the step (224) because the initial-state flag is not ON at the step (219), thus setting the data of the road-level counter in the reception counter II. Thus, after the initial state has ended, neither the road-level counter nor the reception counter II is updated insofar as $|a| \geq \alpha$ and $|a| < \beta$. Updating occurs only in the case of $|a| < \alpha$.

Thus, in the initial state of the system, the data of the reception counter II are updated when the difference $|a|$ is smaller than the value $\alpha$ and, even if it is larger than the value $\alpha$, is smaller than the value $\beta$, the data of the reception counter II being thus used as the standard data for a discrimination of the energy reflected from a vehicle. However, after the initial state, since the standard road level providing the basis for standard data has already been set, the standard data are updated only when the value |a| is smaller than α.

Moreover, there are provided a reception counter I, a road-level counter and another reception counter II in such a manner that, in an initial state, the data of the road-level counter and reception counter II are both updated when the difference |a| is smaller than the value α but only the data of the reception counter II are updated at first when the value |a| is larger than the value α and has a positive sign and a value smaller than the value β and, subsequently, at the next reception of the reflected energy, the data of road-level counter and reception counter II are both updated if the value |a| is smaller than the value α. Let it be assumed that the difference a is smaller than the value β just once, e.g. as the time-point t2, due to a noise, for instance. In this arrangement, insofar as this erratic operation is due to a noise, the value a will be larger than the value α at the time-point t3. According to this invention, therefore, the road-level counter is not updated in the above case, thus precluding the possibility that erroneous standard data are executed.

It should be understood that, except at certain transient points, the road-level counter and reception counter are identical in the contents of data. In the second aspect of this invention, the road level counter is the standard plane.

It should be noted here that although the present invention is mainly described with reference to a moving object detection system of vehicles in the foregoing embodiments, the concept of the present invention is not limited in its application to such vehicles alone, but may readily be applicable to detection of various other moving objects or articles within the scope.

Although the present invention has been fully described by way of example with reference to the accompanying drawings, it is to be noted that various changes and modifications are apparent to those skilled in the art. Therefore, unless such changes and modifications depart from the scope of the present invention, they should be construed as included therein.

What is claimed is:

1. A detection system for detecting the presence of moving objects and the like through utilization of ultrasonic energy which comprises a predetermined location provided in a memory unit and having stored therein time from transmission of ultrasonic energy till reception of reflected energy corresponding thereto from a standard surface, means for computing the difference a between the immediately preceding time from transmission of ultrasonic energy till reception of reflected energy corresponding thereto stored in said predetermined location and current time from transmission of ultrasonic energy and reception of reflected energy corresponding thereto, means for storing in said predetermined location said current time from transmission of ultrasonic energy till reception of reflected energy corresponding thereto when the difference a is smaller than a predetermined time α and means for outputting a moving object detection signal when said difference a is larger than a preset time β which is larger than said time α.

2. A detection system as claimed in claim 1, wherein said moving objects are vehicles and the like.

3. A detection system as claimed in claim 1, wherein said standard surface is a road surface.

4. A detection system as claimed in claim 1, further including gate means which is arranged to be opened through discrimination of time period for receiving the reflected energy and is closed after judging time from ultrasonic energy transmission till reception of reflected energy corresponding thereto.

5. A detection system as claimed in claim 4, wherein said gate means is arranged to be selectively opened and closed through processing by a micro-processor.

6. A detection system as claimed in claim 1, wherein said current time from transmission of ultrasonic energy till reception of reflected energy corresponding thereto is stored in said predetermined location only at an initial state and when said difference a is smaller than said preset time β which is larger than said predetermined time α.

7. A detection system as claimed in claim 6, further including a first wave reception counter location in said memory unit in which the time from transmission of ultrasonic energy till reception of reflected energy corresponding thereto is stored and a second wave reception counter location in said memory unit in which said immediately preceding time from transmission of ultrasonic energy till reception of reflected energy corresponding thereto is stored.

8. A detection system as claimed in claim 1, wherein the initial state of the system is determined based on number of moving objects to be detected.

9. A method of automatically setting a standard plane in a traffic detection system employing a microprocessor, said method comprising the steps of providing in a memory a predetermined location in which a time after transmission of ultrasonic energy till reception of a reflected energy corresponding to said energy from a road surface is stored, determining a time after transmission of ultrasonic energy till reception of reflected energy corresponding to said energy by means of said micro-processor, loading the micro-processor with data from said predetermined location to compute a difference a from a time after a current transmission of ultrasonic energy till reception of reflected energy corresponding thereto, storing said current time in said predetermined location when said difference a is smaller than a preset time α, storing data representing said current time till reception of reflected energy in said predetermined location when said difference a is smaller than β which is a preset time larger than said time α and only in an initial state, and outputting a vehicle detection signal when said difference a is larger than said time β.

10. A method of automatically setting a standard plane in a traffic detection system employing a microprocessor, said method comprising the steps of providing in a memory a predetermined location in which a time after transmission of ultrasonic energy till reception of reflected energy corresponding to said energy from a road surface is stored, a first wave-reception counter location in said memory in which a time after transmission of ultrasonic energy till reception of reflected energy corresponding to said energy is stored and a second wave-reception counter location in said memory in which a time after an immediately preceding transmission of ultrasonic energy till reception of reflected energy corresponding thereto is stored, determining a time after transmission of ultrasonic energy till reception of reflected energy corresponding thereto, storing this said time in said first wave-reception counter location, computing a difference a between data in said first reception counter area and data in said second reception counter location, storing said data of said first reception counter location in said second reception counter location and predetermined location when said difference a is smaller than a preset time α, storing said data of said first reception counter location in said second reception counter location when said difference a is larger than said time α and smaller than β which is a preset time larger than said time α and only in an initial state, and storing said data of said predetermined location in said second wave-reception counter location, and producing a vehicle detection signal when said difference a is larger than said time β.

11. A method of detecting the presence of objects such as vehicles and the like through utilization of ultrasonic energy with employment of a micro-processor, said method comprising the steps of arranging a detection gate to be opened through discrimination of the time period for receiving reflected energy by the microprocessor and to be closed after judging by the microprocessor the time from transmission of ultrasonic energy till reception of reflected energy corresponding thereto, computing a difference a between the time from transmission of ultrasonic energy till reception of reflected energy corresponding thereto from a road surface and the current time from transmission of ultrasonic energy till reception of reflected energy corresponding thereto by loading the microprocessor from a memory location in which the time from transmission of ultrasonic energy till reception of reflected energy corresponding thereto from the road surface is stored, storing data representing time from said current transmission of ultrasonic energy till reception of the reflected energy corresponding thereto in said memory location when said difference a is smaller than a predetermined time α, and outputting a vehicle detection signal when said difference a is larger than a time β which is larger than said time α.

* * * * *